(12) United States Patent
Wang et al.

(10) Patent No.: US 10,841,270 B2
(45) Date of Patent: Nov. 17, 2020

(54) METHODS AND DEVICES FOR SWITCHING A VIRTUAL INTERNET PROTOCOL ADDRESS

(71) Applicant: ALIBABA GROUP HOLDING LIMITED, Grand Cayman (KY)

(72) Inventors: Yingbin Wang, Hangzhou (CN); Cheng Gang, Bellevue, WA (US)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 188 days.

(21) Appl. No.: 15/855,938

(22) Filed: Dec. 27, 2017

(65) Prior Publication Data

US 2018/0183750 A1 Jun. 28, 2018

(30) Foreign Application Priority Data

Dec. 28, 2016 (CN) .......................... 2016 1 1238096

(51) Int. Cl.
*H04L 29/12* (2006.01)
*H04L 12/26* (2006.01)
*G06F 9/455* (2018.01)

(52) U.S. Cl.
CPC ........ *H04L 61/103* (2013.01); *G06F 9/45558* (2013.01); *H04L 61/15* (2013.01);
(Continued)

(58) Field of Classification Search
CPC . H04L 61/103; H04L 43/10; H04L 29/12018; H04L 29/12028; H04L 29/12009; G06F 9/45558
(Continued)

(56) References Cited

U.S. PATENT DOCUMENTS 7,881,208 B1  2/2011 Nosella et al.
8,958,420 B1* 2/2015 Shekhar .............. H04L 41/0896
                                                  370/384
(Continued)

FOREIGN PATENT DOCUMENTS

CN       1855916 A    11/2006
CN     101635648 A     1/2010
(Continued)

OTHER PUBLICATIONS

PCT International Search Report and Written Opinion issued in International Application No. PCT/US17/68555, dated Mar. 19, 2018 (17 pages).

(Continued)

*Primary Examiner* — Minh Chau Nguyen
(74) *Attorney, Agent, or Firm* — Finnegan, Henderson, Farabow, Garrett & Dunner, LLP

(57) ABSTRACT

Methods and devices for switching a virtual internet protocol (VIP) address are provided. In one implementation, the method may include sending to a control center of a VIP address system a first address resolution protocol (ARP) mapping message for mapping a VIP address to a VM address of a virtual machine (VM) of the VIP address system. The control center may be configured to determine the VM corresponding to the VM address as the master VM using the VIP address. The VIP address system may include one or more VMs connected to one or more virtual switches, the one or more VMs and one or more virtual switches being located in one or more hosts that are connected to the control center via a cloud network. The method may further include sending a notification message from the control center determining the master VM to a VM in the VIP address system.

34 Claims, 7 Drawing Sheets

(52) U.S. Cl.
CPC ............... *G06F 2009/4557* (2013.01); *G06F 2009/45595* (2013.01); *H04L 43/10* (2013.01)

(58) Field of Classification Search
USPC ........................................................ 709/245
See application file for complete search history.

(56) References Cited

U.S. PATENT DOCUMENTS

| | | | |
|---|---|---|---|
| 9,325,602 B2 | 4/2016 | Stroomer et al. | |
| 10,205,701 B1* | 2/2019 | Voss .................... | H04L 61/2015 |
| 10,341,233 B2* | 7/2019 | Jain | |
| 2005/0265230 A1 | 12/2005 | Na et al. | |
| 2013/0159487 A1* | 6/2013 | Patel .................... | H04L 67/1031 709/223 |
| 2013/0195487 A1 | 8/2013 | Yamashita et al. | |
| 2013/0198352 A1* | 8/2013 | Kalyanaraman ........ | H04L 67/34 709/223 |
| 2013/0297596 A1 | 11/2013 | Mouline et al. | |
| 2014/0344424 A1* | 11/2014 | Sato ..................... | G06F 9/4856 709/221 |
| 2015/0195137 A1* | 7/2015 | Kashyap ............ | H04L 41/0893 370/254 |
| 2016/0323427 A1* | 11/2016 | Guan .................. | H04L 67/1002 |
| 2017/0054654 A1* | 2/2017 | Garg .................. | H04L 41/0813 |
| 2019/0273683 A1* | 9/2019 | Jiang ....................... | H04L 49/70 |

FOREIGN PATENT DOCUMENTS

| | | |
|---|---|---|
| CN | 104320282 A | 1/2015 |
| WO | WO 2018/125924 A1 | 7/2018 |

OTHER PUBLICATIONS

Extended European Search Report dated Sep. 25, 2019, issued in EP Application No. 17886283.5 (9 pages).
Qian, Hangwei et al., "Mega Data Center for Elastic Internet Applications," *2014 IEEE International Parallel & Distributed Processing Symposium Workshops*, Phoenix, AZ, 2014, pp. 868-874. doi: 10.1109/IPDPSW.2014.99.
Liran Sidki et al., "Fault Tolerant Mechanisms for SDN Controllers," *2016 IEEE Conference on Network Function Virtualization and Software Defined Networks (NFV-SDN)*, Palo Alto, CA, 2016, pp. 173-178. doi: 10.1109/NFV-SDN.2016.7919494.
First Chinese Office Action issued in Chinese Application No. 201611238096.0 dated Aug. 27, 2020, 10 pages.

* cited by examiner

METHODS AND DEVICES FOR SWITCHING A VIRTUAL INTERNET PROTOCOL ADDRESS

CROSS-REFERENCE TO RELATED APPLICATION

This application claims priority to and benefits of Chinese Patent Application Serial No. 201611238096.0, filed with the State Intellectual Property Office of P. R. China on Dec. 28, 2016, which is incorporated herein by reference in its entirety.

BACKGROUND

In a physical network of existing technologies, a floating Internet Protocol (IP) address is a shared virtual IP address used for server switching in a dual-host server backup circumstance. Using the floating IP address, an application end may not detect the switch of the IP address of the local host server. When the IP address floats to a physical server, the physical server may declare the floating IP address as using the Address Resolution Protocol (ARP), and provide services via the floating IP address. However, the range the floating IP address may reach is limited by the number of ports of the physical servers, and typically does not go beyond one hundred physical servers.

In a cloud network, a virtual internet protocol (VIP) address used by a physical server is allocated and managed by a virtualization platform. However, the virtualization platform does not allow for IP floating among Virtual Machines (VMs). Cloud network applications or software, such as Keepalived and Heartbeat, may only run normally when the host servers have the ability to switch using a floating IP. Therefore, to run these applications or software in a cloud network, their software codes would need to be modified.

SUMMARY

The embodiments of present application provide methods and devices for switching a VIP address. The methods and devices may advantageously solve the problem of IP address floating among Virtual Machines (VMs) that cannot be achieved in the existing cloud network, thereby allowing for the running of high availability applications or software in the existing cloud network.

In some embodiments, the present disclosure provides a method for switching a virtual internet protocol (VIP) address. The method may include sending to a control center of a VIP address system a first address resolution protocol (ARP) mapping message for mapping a VIP address to a VM address of a virtual machine (VM) of the VIP address system. The control center is configured to determine the VM corresponding to the VM address as the master VM using the VIP address. The VIP address system may include one or more VMs connected to one or more virtual switches, the one or more VMs and one or more virtual switches being located in one or more hosts that are connected to the control center via a cloud network. The method may further include sending a notification message to a VM in the VIP address system. The notification message is from the control center determining the master VM.

In some embodiments, the present disclosure provides a method for switching a virtual internet protocol (VIP) address. The method may include receiving, from a virtual switch, a first ARP mapping message for mapping a VIP address to a virtual machine (VM) of a VIP address system using the VIP address. The VIP address system may include one or more VMs connected to one or more virtual switches, the one or more VMs and one or more virtual switches being located in one or more hosts. The method may further include determining the VM as the master VM based on the first ARP mapping message; and sending a notification message of determining the master VM to a VM in the VIP address system via the virtual switch connected to the VM.

In some embodiments, the present disclosure provides a non-transitory computer readable medium that stores a set of instructions that is executable by at least one processor of a server to cause the server to perform a method for switching a virtual internet protocol (VIP) address. The method may include providing for sending to a control center of a VIP address system a first address resolution protocol (ARP) mapping message for mapping a VIP address to a VM address of a virtual machine (VM) of the VIP address system. The control center is configured to determine the VM corresponding to the VM address as the master VM using the VIP address. The VIP address system may include one or more VMs connected to one or more virtual switches, the one or more VMs and one or more virtual switches being located in one or more hosts connected to the control center via a cloud network. The method may further include providing for sending a notification message from the control center determining the master VM to a VM in the VIP address system.

In some embodiments, the present disclosure provides a non-transitory computer readable medium that stores a set of instructions that is executable by at least one processor of a server to cause the server to perform a method for switching a virtual internet protocol (VIP) address. The method may include acquiring, from a virtual switch, a first ARP mapping message for mapping a VIP address to a virtual machine (VM) of a VIP address system using the VIP address. The VIP address system may include one or more VMs connected to one or more virtual switches, the one or more VMs and one or more virtual switches being located in one or more hosts. The method may further include determining, based on the first ARP mapping message, the VM as the master VM; and providing for sending, via the virtual switch, a notification message of determining the master VM to a VM in the VIP address system.

In some embodiments, the present disclosure provides a virtual internet protocol (VIP) address switching apparatus. The apparatus may include a first sending unit configured to send to a control center of a VIP address system a first address resolution protocol (ARP) mapping message for mapping a VIP address to a VM address of a virtual machine (VM) of the VIP address system. The VIP address system may include one or more VMs connected to one or more virtual switches, the one or more VMs and one or more virtual switches being located in one or more hosts that are connected to the control center via a cloud network. VIP address may be used by the control center to determine the VM corresponding to the VM address as the master VM. The apparatus may further include a second sending unit configured to send a notification message to a VM in the VIP address system. The notification message is from the control center determining the master VM.

In some embodiments, the present disclosure provides a virtual internet protocol (VIP) address system. The system may include a control center, and at least one host connected to the control center via a cloud network, the at least one host being provided with a virtual machine (VM) and a virtual switch connected to the VM. The virtual switch is configured to send to the control center an ARP mapping message for mapping a VIP address to a VM address of a VM. The control center is configured to receive the ARP mapping message from the virtual switch, determine, based on the ARP mapping message, the VM as the master VM, and send, via the virtual switch, the notification message of determining the master VM to a VM in the VIP address system.

In accordance with the technical solutions provided by the present disclosure, a virtual switch sends to a control center a first ARP mapping message for mapping a VIP address to a VM address of a VM of a VIP address system. This allows the control center to determine a VM corresponding to the VM address as the master VM using the VIP address and the other VMs as backup VMs. The control center may return, via a virtual switch, an identifier of the master VM by carrying the identifier in a notification message to a VM connected to the virtual switch, thereby facilitating the forwarding of data associated with the VIP address to the master VM. In this way, an ARP request can be processed in the VIP address system based on a cloud network, the VIP address floating in the cloud network can be achieved, and VRRR (Virtual Router Redundancy Protocol)-based software with high availability, such as Keepalived and Heartbeat, can be used.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings constitute a part of this specification. The drawings illustrate several embodiments of the present disclosure and, together with the description, serve to explain the principles of the disclosure.

DETAILED DESCRIPTION

Figure 1:
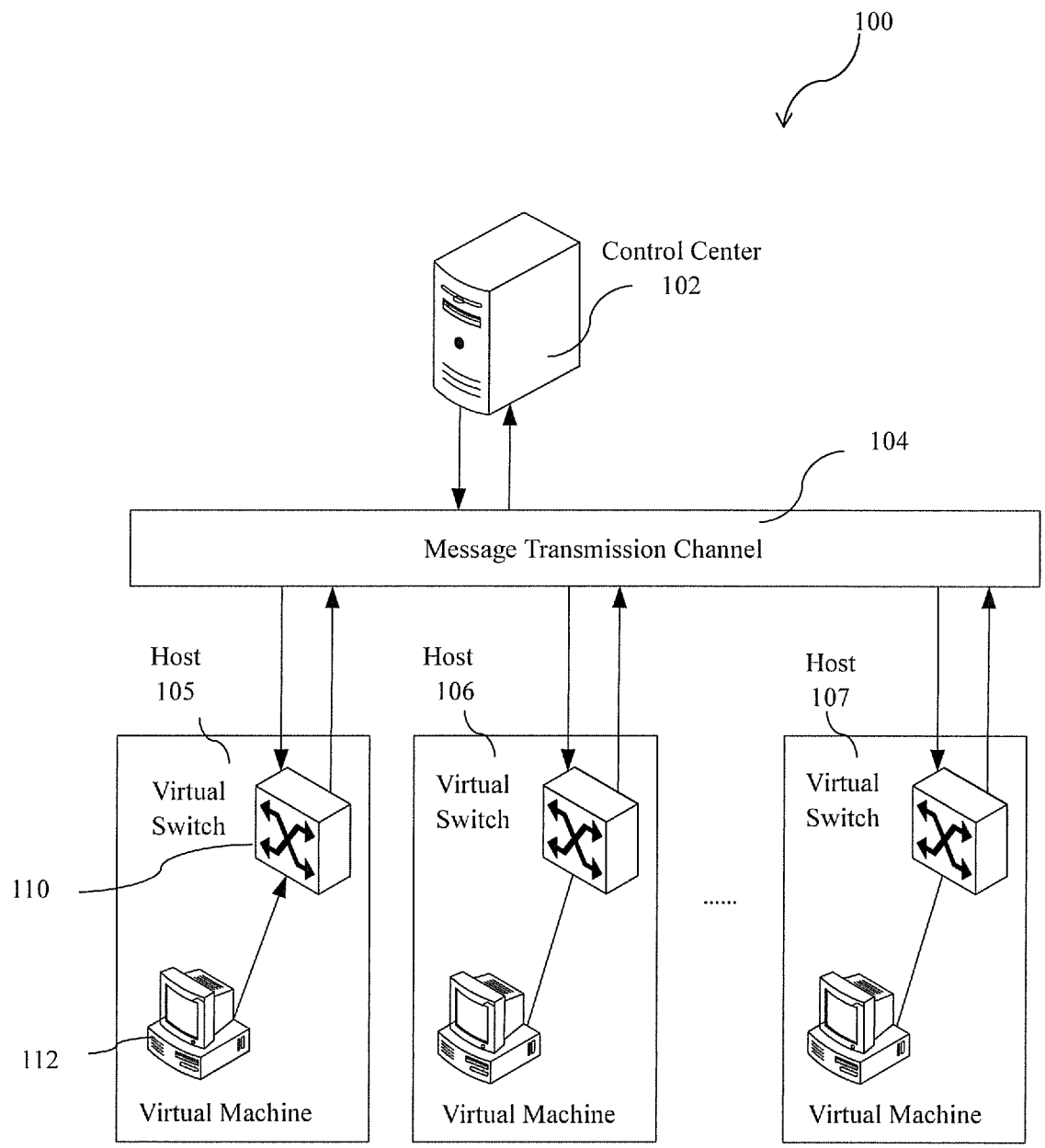
FIG. 1 is a schematic diagram illustrating an exemplary architecture for switching a virtual internet protocol address, consistent with embodiments of the present disclosure.

Reference will now be made in detail to embodiments and aspects of the present disclosure, examples of which are illustrated in the accompanying drawings. Where possible, the same reference numbers will be used throughout the drawings to refer to the same or like parts.

In existing techniques, an IP address in a virtual network can appear unchanged to the outside using a Software Load Balancer scheme. In this scheme, it is assumed that there are a first virtual machine (VM 1) having an address of IP 1 and a second virtual machine (VM 2) having an address of IP 2. Currently, the VM 1 is the master VM. The Software Load Balancer uses a mapping relationship between a VIP and the IP 1. The Software Load Balancer thus currently presents to the outside that the VIP is the serving IP address. When the VM 1 is detected to be abnormal, an Application Programming Interface (API) of the Software Load Balancer is called to change the mapping relationship between the VIP and the IP address. For example, the mapping relationship can be modified as a mapping relationship between the VIP and the IP 2 such that the standby VM2 at the back end is switched to be the master VM while the IP address presented to the outside remains the VIP address, unchanged. In this scheme, the Software Load Balancer does not perform IP address floating. When the master VM is abnormal, the Software Load Balancer needs to modify the mapping relationship between the VIP and the IP address of a VM so that the IP address presented to the outside can remain unchanged. In addition, since the Software Load Balancer is designed based on a four-layer Transmission Control Protocol (TCP) or User Datagram Protocol (UDP), it is not suitable for two-layer or three-layer network architecture, which limits the use of the Software Load Balancer.

Therefore, the embodiments of the present disclosure provide methods and devices for switching a VIP address in a cloud network system. The methods and devices allow for the connection of a control center with one more host servers associated with one or more VMs and virtual switches via a message transmission channel of the cloud network, thereby constructing a cloud network-based VIP address system. In an exemplary VIP address system, a virtual switch sends to the control center a first ARP mapping message received by the VM for mapping a VIP address to a VM address. This allows the control center to determine the VM corresponding to the VM address as the master VM using the VIP address and to determine other VMs as backup VMs. The control center returns an identifier of the master VM by carrying the identifier in a notification message sent to each VM in the VIP address system via the virtual switch. This in turn facilitates the forwarding of data associated with the VIP address to the master VM. In this way, an ARP request can be processed and the IP address floating in the cloud network can be achieved without conducting any control over or amending the relationship between the master and backup VMs. Thus, the present disclosure solve the problems of existing techniques, such as not performing IP address floating in a cloud network, being only applicable to four- or more-layer network protocols, etc.

As described herein, the embodiments consistent with the present disclosure can be applied to an exemplary server. The exemplary server can be a physical or logical server. Various functions of the exemplary can also be achieved by cooperation between two or more physical or logical servers that take on different responsibilities. Any suitable type of server, and any suitable type and protocol of the communication network between servers, etc., may be used by embodiments of the present disclosure.

FIG. 1 a schematic diagram illustrating an exemplary architecture for switching a VIP address, consistent with embodiments of the present disclosure. As shown in FIG. 1, the architecture is herein referred to as a VIP address system 100, which may include: a control center 102, a message transmission channel 104 based on a cloud network connected to control center 102, and several hosts or host servers 105-107 connected to message transmission channel 104, wherein each host is provided with a virtual switch (e.g., virtual switch 110 of host 105) and a VM (e.g., virtual machine 112 of host 105) connected to the virtual switch. In this exemplary architecture, the IP address used by each VM is the same VIP address, but the VIP address can only be used by one VM at one time, and cannot be used by two or more VMs at the same time. Control center 102 can be a server, and there may be, for example, hundreds of thousands of hosts connected to the message transmission channel.

Figure 2:
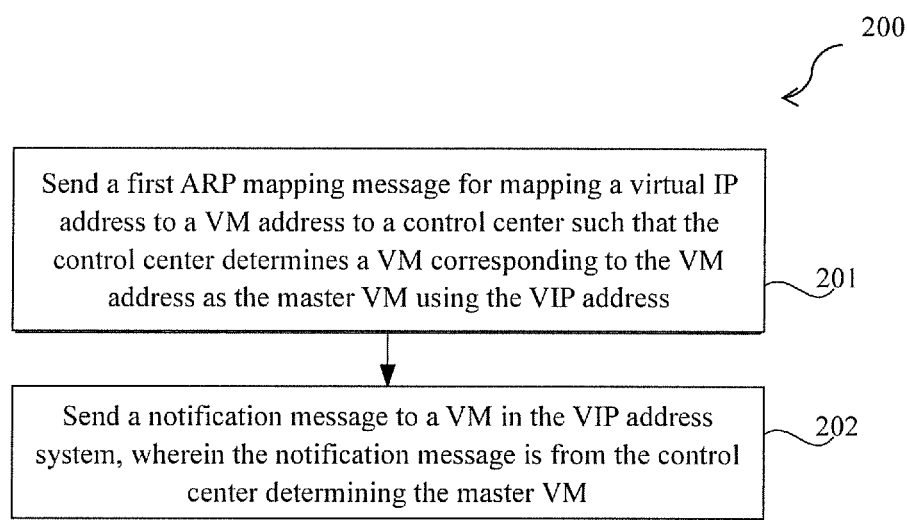
FIG. 2 is a flow chart of an exemplary method for switching a virtual internet protocol address, consistent with embodiments of the present disclosure.

FIG. 2 is a flow chart of an exemplary method 200 for switching a VIP address, consistent with embodiments of the present disclosure. Method 200 can be performed by a virtual switch, such as virtual switch 110 of FIG. 1. As shown in FIG. 2, method 200 may include steps 201 and 202.

In step 201, the virtual switch receives a first ARP mapping message for mapping a VIP address to a VM address and sends the first ARP mapping message to a control center (e.g., control center 102 of FIG. 1). The control center determines a VM corresponding to the VM address as the master VM using the VIP address.

Among various VMs in a VIP address system, a certain VM can send, when using a VIP address, an ARP request to a virtual switch connected to the VM. The virtual switch receives the ARP request, and sends to a control center an ARP mapping message for mapping the VIP address to the VM. The ARP mapping message may carry an identifier of a host where the VM is located, such as an IP address of the host. The ARP mapping message may also carry the IP address of the VM, and may further carry the VIP address currently used by the VM. After receiving the mapping message, the control center determines the VM currently using the VIP address as the master VM for processing the ARP request. Then, the control center records an identifier of the VM currently using the VIP address, such as the IP address of the VM and the IP address of the host where the VM is located.

In step 202, one or more virtual switches send a notification message from the control center determining the master VM to their corresponding VMs in the VIP address system such that data associated with the VIP address is forwarded to the master VM.

In some embodiments, the virtual switches each can send to their corresponding VMs a notification message from the control center for indicating an identifier of the master VM currently using the VIP address. Accordingly, after receiving the notification message, each VM may determine whether the identifier in the notification message is consistent with its own identifier. If the identifier in the notification message is consistent with its own identifier, the VM determines that it is the master VM, and thus can use the VIP address for communication, and may process the received data associated with the VIP address, such as the ARP request. If the identifier in the notification message is inconsistent with its own identifier, the VM determines that it is not the master VM, but a backup VM, and thus can release network resources occupied thereby and may not use the VIP address for communication. In such instances, the network resources can be allocated to and used by the master VM, thereby improving the running efficiency of the master VM and/or increasing the availability of the cloud network.

In some embodiments, the control center does not deliver the notification message after recording an identifier of a VM currently using the VIP address. Each VM autonomously sends, when needed or at a set time interval, a message acquisition request to the control center to request to obtain an identifier of the VM currently using the VIP address, thereby pulling the information about the master VM. In such instances, a virtual switch corresponding to a VM may send to the control center a request message sent by the VM for acquiring the identifier of the master VM. Subsequently, the virtual switch can receive a response message returned by the control center and carrying the identifier of the master VM. The virtual switch then may send the response message to the VM, so that the VM determines whether it is the master VM itself based on the master VM identifier. Accordingly, the consumption of network resources can be reduced. The use of network resources caused by the control center delivering the notification message while the VM runs abnormally and cannot receive the notification message can be reduced or avoided.

In the embodiments of the present application, only the VM that is determined by the control center as the master VM is responsible for using the VIP address for communication with an external device, such as receiving data associated with the VIP address, and responding to the ARP request. All data associated with the VIP address can be forwarded to the master VM for processing.

When a VM determines that it is not the master VM itself, it can acquire an association relationship between its identifier and a priority level to become the master VM, and thus can determine its priority for becoming the master VM. In some embodiments, a backup VM with the highest priority can monitor the health condition of the master VM, and switch its address to the VIP address when the master VM is detected to be abnormal, so as to facilitate or maintain normal communication. A backup VM having a lower priority level can stay in an idle or substantially idle state, and can release network resources occupied for the master VM to use, thereby improving and/or maintaining the running efficiency of the master VM.

In some embodiments, each VM has a priority level that indicates the order of each VM, when serving as a backup VM, to become the master VM. The priority level can be determined based on various factors, such as the configuration of a VM and the configuration of a host where the VM is located. The association relationship between the identifier of a VM and its priority level can be stored in the control center, or in the corresponding host. The process for acquiring a priority level may include: the virtual switch sending to the control center a request message sent by a backup VM for acquiring the association relationship; the virtual switch receiving the association relationship returned by the control center; and the virtual switch sending the association relationship to the backup VM such that the backup VM can determine its own priority level and/or order to become the master VM based on the association relationship.

In some embodiments, the backup VM that determines its priority level to be the highest may detect the health condition of the master VM at a set time interval. For example, the backup VM with the highest priority level can detect whether the master VM is abnormal, and can switch its IP address to the VIP address to maintain normal communication when the master VM is detected to be abnormal, such as when the master VM fails, when the host where the master VM is located fails, and at time of network failure.

In some embodiments, in the VIP address system, when the master VM is determined to be abnormal, the backup VM with the highest priority sends a second ARP request to the virtual switch after executing the VIP address switch. However, packet loss may occur such that the virtual switch may not receive the second ARP request, and thus does not know that the backup VM has switched to the VIP address. Therefore, the virtual switch cannot second the second ARP request to the control center, and the control center cannot update in time the recorded information of the master VM currently using the VIP address, which may in turn affect the real-time performance of the IP address floating. To reduce or avoid the occurrence of such a situation, the virtual switch can regularly inspect the condition of a VM using the VIP address. If the last inspection result is that the VIP address is not used by the VM, while the present inspection result is that the VIP address is being used by the VM, the virtual switch can determine that an IP address switching has occurred, and that the VM has switched to the VIP address. If the last inspection result is that the VIP address was being used, while the present inspection result is that the VIP address is not being used, the virtual switch can determine that an IP address switch occurred, and the VIP address has been switched to another VM. In both circumstances, the virtual switch may send a message regarding the switch to the control center in the form of an ARP mapping message so that the control center can update in time the stored identifier of the master VM, i.e., the IP address of the host where the master VM is located and the IP address of the master VM. The virtual switch can also receive a heartbeat message sent by a VM to determine whether a VIP address switch has occurred, and to determine whether to send an ARP mapping message to the control center.

In some embodiments, when the master VM is determined to be abnormal and the backup VM with the highest priority is switched to the VIP address, a second ARP request is sent by the backup VM to the virtual switch connected thereto. Based on the second ARP request, the virtual switch sends to the control center a second ARP mapping message for mapping the VIP address to the backup VM, the second ARP mapping message carrying the IP address of the host where the backup VM is located, the IP address of the VM, and the VIP address. The control center receives the second ARP mapping message, determines the corresponding backup VM as the master VM, and records an identifier of the new master VM. Then the virtual switch may each send to its corresponding VM a notification message from the control center that indicates the identifier of the master VM currently using the VIP address. The original master VM that was abnormal can become a backup VM as well because it does not use the VIP address any more. Therefore, the control center determines the VM currently using the VIP address as the master VM.

In the embodiments consistent with the present disclosure, in an exemplary cloud network-based VIP address system, the virtual switch sends to the control center a first ARP mapping message received by a VM for mapping a VIP address to a VM address. This allows the control center to determine the VM corresponding to the VM address as the master VM using the VIP address and to determine other VMs as backup VMs. The control center returns an identifier of the master VM by carrying the identifier in a notification message sent to each VM in the VIP address system via the virtual switch. This in turn facilitates the forwarding of data associated with the VIP address to the master VM. In this way, an ARP request can be processed and IP-address floating in the cloud network can be achieved without conducting any control over or amending the relationship between the master and backup VMs, thereby allowing for the convenient use of software with high availability, such as Keepalived and Heartbeat. In addition, the message transmission channel based on a cloud network can be connected to hundreds of thousands of hosts, which advantageously expands the range the floating VIP address can reach, comparing to about one hundred hosts connected in a physical network due to the limited number of ports.

Figure 3:
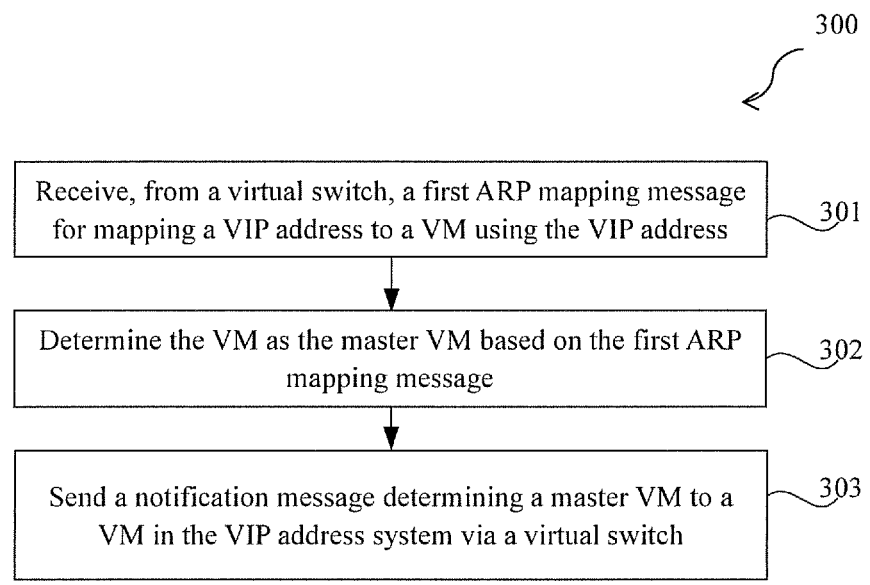
FIG. 3 is a flow chart of an exemplary method for switching a virtual internet protocol address, consistent with embodiments of the present disclosure.

FIG. 3 is a flow chart of an exemplary method 300 for switching a virtual internet protocol address, consistent with embodiments of the present disclosure. Method 300 can be performed by a control center, such as control center 102 of FIG. 1. Method 300 may include steps 301-303.

In step 301, the control center receives from a virtual switch a first ARP mapping message for mapping a VIP address to a VM using the VIP address.

As described above with reference to FIG. 2, the VM using the VIP address may send to a control center a first ARP mapping message via a virtual switch connected thereto, the first ARP mapping message carrying the IP address of a host where the VM is located, the IP address of the VM, and the VIP address.

In step 302, the control center determines the VM as the master VM based on the first ARP mapping message.

In some embodiments, a VM corresponding to the first ARP mapping message received by the control center is the VM currently using the VIP address. The control center records the IP address of the host and the IP address of the VM in the first ARP mapping message, and determines the VM currently using the VIP address as the master VM. Accordingly, other VMs in the VIP address system, i.e., VMs currently not using the VIP address, are backup VMs.

In step 303, the control center sends a notification message determining the master VM to one or more VMs in the VIP address system via one or more virtual switches connected thereto such that data associated with the VIP address is forwarded to the master VM.

As described above with reference to FIG. 2, the control center may deliver to each VM a notification message for identifying an identifier of the master VM currently using the VIP address, and each VM may also actively acquire the identifier of the master VM from the control center.

In some embodiments, the control center can also determine the priority level of each VM to become the master VM based on the configuration of each VM, and may store an association relationship between the priority level and the identifier of each VM. In this way, a VM, such as a backup VM, can acquire the association relationship from the control center, and thus acquire its own priority level and determine whether to monitor the health condition of the master VM.

In some embodiments, when the master VM is determined to be abnormal, the control center allows the VIP address to remain unchanged during a disaster recovery switch process by determining a new master VM, achieving IP address floating in the cloud network, thereby improving the high availability of the VIP address system, and allowing for convenient use of common high availability software, such as Keepalived and Heartbeat, without the need to modify codes of such software. In addition, the use of an ARP protocol in embodiments of the present disclosure is applicable to two- and more-layer network architectures.

The embodiments of the present disclosure also provide exemplary apparatuses and devices for switching a VIP address. The exemplary apparatuses and devices may implement the exemplary methods described above. The structures of the exemplary apparatuses and devices are described and illustrated below with reference to FIGS. 4-7.

Figure 4:
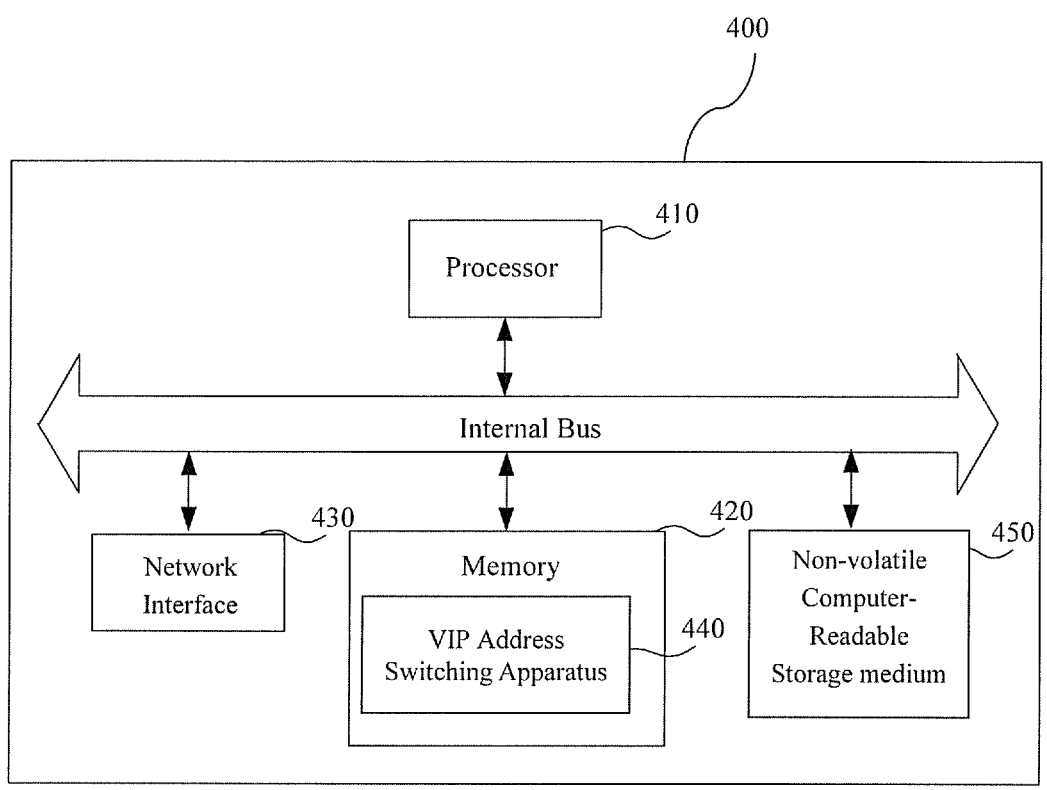
FIG. 4 is a schematic diagram illustrating the hardware structure of an exemplary device for switching a virtual internet protocol address, consistent with embodiments of the present disclosure.

In some embodiments, a control center may implement VIP address switching methods or apparatuses consistent with the present disclosure. Apparatus embodiments of the present disclosure may take the form of an entirely hardware embodiment, an entirely software embodiment, or an embodiment combining software and hardware. For an exemplary software embodiment, an apparatus may be a logical module of computer program instructions stored in a non-volatile computer-readable storage medium, read into a memory, and executed by a processor of a device. The one or more modules configured for execution on computing devices can be provided on a non-transitory computer readable medium, such as a compact disc, digital video disc, RAM, ROM, flash drive, or any other non-transitory medium, or as a digital download (and can be originally stored in a compressed or installable format that requires installation, decompression, or decryption prior to execution). FIG. 4 is a schematic diagram illustrating the hardware structure of an exemplary device 400 for switching a VIP address, consistent with embodiments of the present disclosure. As shown in FIG. 4, device 400 for switching a VIP address may include a processor 410, a memory 420, a network interface 430, and a non-volatile computer-readable storage medium 450. An exemplary VIP address switching apparatus 440 implemented by a control center may be a logical module of computer program instructions that are stored in non-volatile computer-readable storage medium 450, read into memory 420, and executed by processor 410 of device 400. Device 400 where the apparatus 440 is located can further include other hardware components that perform other functions of device 400 not shown in FIG. 4.

Figure 5:
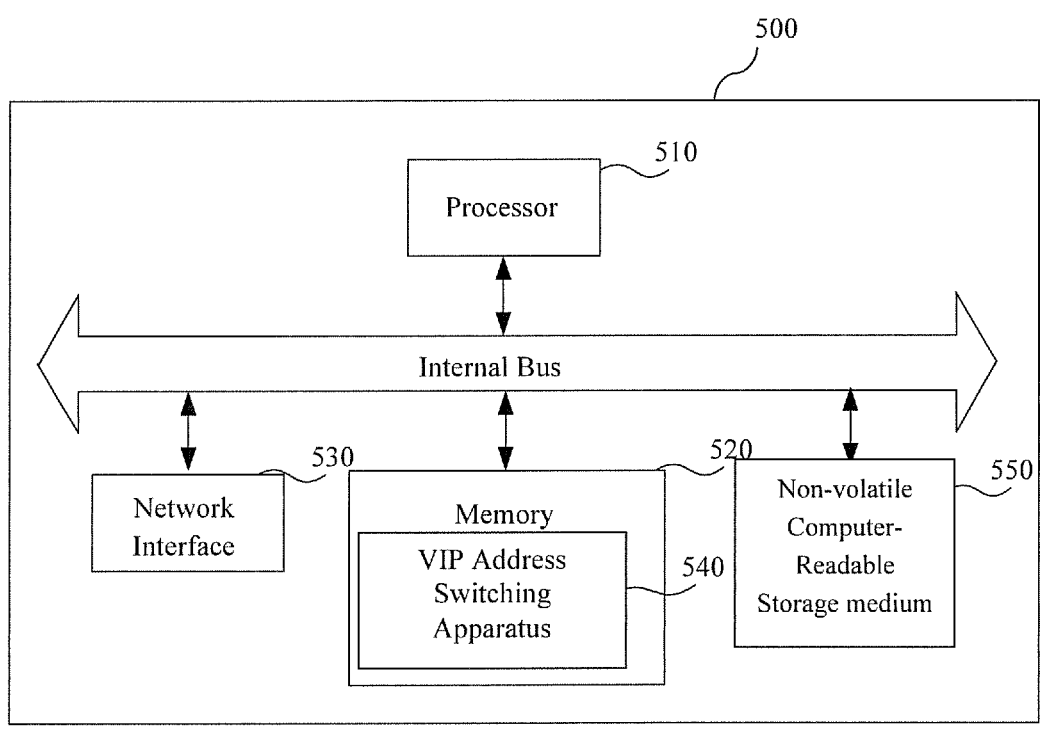
FIG. 5 is a schematic diagram illustrating the hardware structure of an exemplary device for switching a virtual internet protocol address, consistent with embodiments of the present disclosure.

In some embodiments, a server may implement VIP address switching methods or apparatuses consistent with the present disclosure. Apparatus embodiments of the present disclosure may take the form of an entirely hardware embodiment, an entirely software embodiment, or an embodiment combining software and hardware. For an exemplary software embodiment, an apparatus may be a logical module of computer program instructions stored in a non-volatile computer-readable storage medium, read into a memory, and executed by a processor of a device. The one or more modules configured for execution on computing devices can be provided on a non-transitory computer readable medium, such as a compact disc, digital video disc, RAM, ROM, flash drive, or any other non-transitory medium, or as a digital download (and can be originally stored in a compressed or installable format that requires installation, decompression, or decryption prior to execution). FIG. 5 is a schematic diagram illustrating the hardware structure of an exemplary device 500 for switching a VIP address, consistent with embodiments of the present disclosure. As shown in FIG. 5, device 500 for switching a VIP address may include a processor 510, a memory 520, a network interface 530, and a non-volatile computer-readable storage medium 540. An exemplary VIP address switching apparatus 540 implemented by a server may be a logical module of computer program instructions that are stored in non-volatile computer-readable storage medium 550, read into memory 520, and executed by processor 510 of device 500. Device 500 where the apparatus 540 is located can further include other hardware components that perform other functions of device 500 not shown in FIG. 5.

Figure 6:
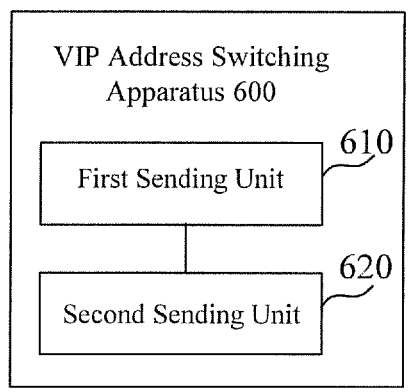
FIG. 6 is a schematic block diagram of an exemplary apparatus for switching a virtual internet protocol address, consistent with embodiments of the present disclosure.

FIG. 6 is a schematic block diagram of an exemplary apparatus 600 for switching a VIP address, consistent with embodiments of the present disclosure. The exemplary apparatus can be implemented in a VIP address system. As shown in FIG. 1, the VIP address system may include a control center and several hosts connected to the control center via a cloud network. Each host can be provided with a VM and a virtual switch connected to the VM. Apparatus 600 can be implemented using one or more modules/units (and any corresponding sub-modules/sub-units), which can be a packaged functional hardware unit designed for use with other components (e.g., portions of an integrated circuit) and/or a part of a program (stored on a computer readable medium, e.g. a non-volatile storage medium) that performs a particular function of related functions. The one or more modules can have entry and exit points and can be written in a programming language, such as, for example, Java, Lua, C, or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a non-transitory computer readable medium, such as a compact disc, digital video disc, RAM, ROM, flash drive, or any other non-transitory medium, or as a digital download (and can be originally stored in a compressed or installable format that requires installation, decompression, or decryption prior to execution). Software code can be stored, partially or fully, on a memory device of the executing computing device, for execution by apparatus 600. Software instructions can be embedded in firmware, such as an EPROM. It will be further appreciated that hardware modules can be comprised of connected logic units, such as gates and flip-flops, and/or can be comprised of programmable units, such as programmable gate arrays or processors.

As shown in FIG. 6, apparatus 600 may include a first sending unit 610 and a second sending unit 620. The first sending unit 610 is configured to send to the control center a first ARP mapping message received from a VM for mapping a VIP address to a VM address. This allows the control center to determine the VM corresponding to the VM address as the master VM using the VIP address.

The second sending unit 620 is configured to send a notification message from the control center determining the master VM to a VM in the VIP address system such that data associated with the VIP address is forwarded to the master VM. In some embodiments, the second sending unit 620 may include a first receiving sub-unit. The first receiving sub-unit is configured to receive a notification message, sent by the control center, for indicating an identifier of the master VM currently using the VIP address. In some embodiments, the second sending unit 620 may further include a first sending sub-unit configured to send the notification message to a VM in the VIP address system such that data associated with the VIP address can be forwarded to the master VM.

In some embodiments, apparatus 600 may further include a first receiving unit. The first receiving unit is configured to receive, when the master VM is determined to be abnormal, a second ARP mapping message for mapping the VIP address to the address of one backup VM (different from the master VM) sent by the backup VM after the backup VM switches its IF address to the VIP address.

In some embodiments, apparatus 600 may further include a third sending unit configured to send the second ARP mapping message to the control center such that the control center can determine that the backup VM as the new master VM.

In some embodiments, apparatus 600 may further include a fourth sending unit configured to send to the control center a request message, sent by a VM, for acquiring the master VM identifier, a second receiving unit configured to receive a response message returned by the control center, carrying the master VM identifier, and a first replying unit configured to send the response message to the VM such that the VM determines whether itself is the master VM based on the master VM identifier.

In some embodiments, apparatus 600 may further include a fifth sending unit configured to send to the control center a request message, sent by a backup VM, for acquiring an association relationship; a third receiving unit configured to receive the association relationship returned by the control center, indicating the priority level of the backup VM to become the master VM and the identifier of the backup VM; and a sixth sending unit configured to send the association relationship to the backup VM for the backup VM determines its own priority level to become the master VM.

In some embodiments, sixth sending unit is further configured to: detect, at a set time interval, whether the master VM is abnormal when the priority level of the backup VM to become the master VM is the highest; and release occupied network resources when the priority level of the backup VM to become the master VM is not the highest.

In some embodiments, apparatus 600 may further include a fourth receiving unit configured to receive a heartbeat message sent by a VM; and a first determining unit configured to determine, based on the heartbeat message, whether the VIP address has switched and whether to send a second ARP mapping message to the control center.

Figure 7:
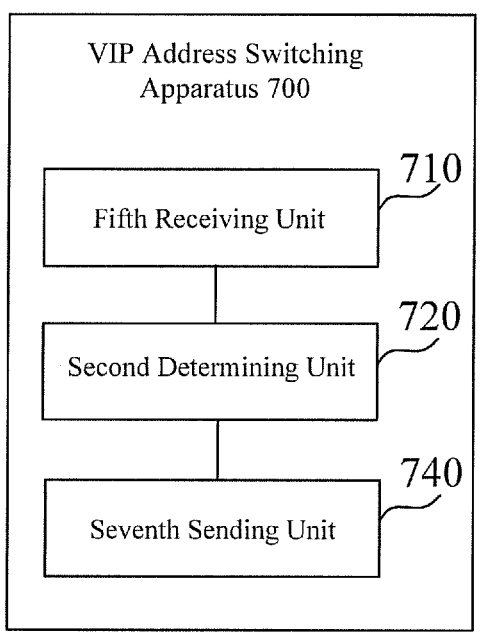
FIG. 7 is a schematic block diagram of an exemplary apparatus for switching a virtual internet protocol address, consistent with embodiments of the present disclosure.

FIG. 7 is a schematic block diagram of an exemplary apparatus 700 for switching a VIP address, consistent with embodiments of the present disclosure. The exemplary apparatus can be implemented in a VIP address system. As shown in FIG. 1, the VIP address system may include a control center and several hosts connected to the control center via a cloud network, with each host being provided with a VM and a virtual switch connected to the VM. Apparatus 700 may include one or more components of apparatus 600 as described above with reference to FIG. 6. Apparatus may 700 also include a fifth receiving unit 710, a second determining unit 720, and a seventh sending unit 740.

Fifth receiving unit 710 is configured to receive, from a virtual switch, an ARP mapping message for mapping a VIP address to a VM using the VIP address.

Second determining unit 720 is configured to determine, based on the ARP mapping message, the VM as the master VM.

Seventh sending unit 740 is configured to send, via the virtual switch, a notification message determining the master VM to a VM in the VIP address system such that data associated with the VIP address is forwarded to the master VM.

In some embodiments, apparatus 700 may further include a sixth receiving unit configured to receive a request message from a VM, sent via the virtual switch, for acquiring the master VM identifier, and a second replying unit configured to send to the VM, via the virtual switch, a response message carrying the identifier of the master VM currently using the VIP address based on the request message.

In some embodiments, apparatus 700 may further include a third determining unit configured to determine the priority level of each VM to become the master VM based on the configuration of each VM in the VIP address; and a storing unit configured to store an association relationship between a priority level and an identifier of each VM.

In some embodiments, apparatus 700 may further include a seventh receiving unit configured to receive a request message for acquiring the association relationship from a backup VM sent via the virtual switch, and a third replying unit configured to send the association relationship to the backup VM via the virtual switch.

In some embodiments, a VIP address system may implement the exemplary methods described above. As shown in FIG. 1, an exemplary VIP address system 100 consistent with the present application includes a control center 102, at least one host (e.g., hosts 105-107) connected to the control center via a cloud network, with the host being provided with a VM (e.g., VM 112) and a virtual switch (e.g., virtual switch 110) connected to the VM. The virtual switch is configured to send to control center 102 an ARP mapping message for mapping a VIP address to a VM address received from the VM such that control center 102 can determine a VM corresponding to the VM address as the master VM using the VIP address. The virtual switch is further configured to send a notification message determining the master VM from control center 102 to a VM in the VIP address system such that data associated with the VIP address is forwarded to the master VM. Control center is configured to receive the ARP mapping message from the virtual switch. Based on the ARP mapping message, control center 102 is further configured to determine the VM as the master. VM and send the notification message of determining the master VM to a VM via the virtual switch.

Similar features and functions of the exemplary VIP address system and the exemplary apparatuses consistent with embodiment of the present disclosure may be found in the description above for the exemplary methods.

The apparatus embodiments described above are merely illustrative. Exemplary modules or units are described as separated components may or may not be physically separated from each other. The exemplary units may or may not be physical units, and may be positioned at one location or may be distributed over multiple networks. One or more of the modules or units may be selected according to practical requirements to achieve the objectives of the solutions of the present disclosure. Similar solutions implemented consistent with embodiments of the present disclosure can also be used.

Consistent with the embodiments of the present disclosure, a control center determines, based on an ARP mapping message sent by a VM via a cloud network, a VM currently using a VIP address as the master VM; and a backup VM automatically switches to the VIP address when the master VM is detected to be abnormal. Without the need to make amendments to the software codes, the VIP address floating in the cloud network can be achieved, and VRRR-based software with high availability, such as Keepalived and Heartbeat, can be used. In addition, as shown in FIG. 1, the message transmission channel based on a cloud network can be connected to hundreds of thousands of hosts, which expands the range of the VIP address floating. This is advantageous over a physical network where about one hundred hosts can be connected in the physical network due to the limited number of ports.

The present disclosure may be described in a general context of computer-executable commands or operations, such as a program module, stored on a computer readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote non-transitory computer-readable storage medium, including a flash disk or other forms of flash memory, a Read-Only Memory (ROM), a Random Access Memory (RAM), a magnetic disk, an optical disk, a cache, a register, etc.

Furthermore, although aspects of the disclosed embodiments are described as being associated with data and/or instructions stored in a memory and/or other tangible and/or non-transitory computer-readable mediums, it would be appreciated that these data and/or instructions can also be stored on and executed from many types of tangible computer-readable storage medium, such as storage devices, including hard disks, floppy disks, or CD-ROM, or other forms of RAM or ROM. Accordingly, the disclosed embodiments are not limited to the above-described examples, but instead is defined by the appended claims in light of their full scope of equivalents.

Embodiments of the present disclosure may be embodied as a method, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above. Furthermore, embodiments of the present disclosure may take the form of a computer program product embodied in one or more computer-readable storage media that may be used for storing computer-readable program codes.

Embodiments of the present disclosure are described with reference to flow charts and/or block diagrams of methods, devices (systems), and computer program products. It will be understood that each flow chart and/or block diagram can be implemented by computer program instructions. These computer program instructions may be provided to a processor of a special-purpose computer, an embedded processor, or other programmable data processing devices or systems to produce a machine or a platform, such that the instructions, when executed via the processor of the computer or other programmable data processing devices, implement the functions and/or steps specified in one or more flow charts and/or one or more block diagrams.

The computer-readable storage medium may refer to any type of non-transitory memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, removable and non-removable media. The information and/or data storage can be implemented with any method or technology. Information and/or data may be modules of computer-readable instructions, data structures, and programs, or other types of data. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), a digital versatile disc (DVD) or other optical storage, a cassette tape, tape or disk storage, or other magnetic storage devices, or any other non-transitory media that may be used to store information capable of being accessed by a computer device.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items. The term "if" may be construed as "at the time of," "when," "in response to," or "in response to determining."

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for switching a virtual internet protocol (VIP) address, the method comprising:
sending to a control center of a VIP address system a first address resolution protocol (ARP) mapping message for mapping a VIP address to a VM address of a virtual machine (VM) of the VIP address system, the VIP address system having one or more VMs connected to one or more virtual switches, the one or more VMs and one or more virtual switches being located in one or more hosts that are connected to the control center via a cloud network, wherein the ARP mapping message is associated with a VM currently using the VIP address, includes the VIP address and the VM address of the VM currently using the VIP address, and is used by the control center to determine the VM currently using the VIP address as a master VM; and
sending a notification message to a VM in the VIP address system, wherein the notification message is from the control center and includes an identifier of the master VM.

2. The method of claim 1, further comprising:
sending to the control center a request message sent by a backup VM for acquiring an association relationship between an identifier of the backup VM and its priority level to become the master VM;
receiving the association relationship from the control center; and
sending the association relationship to the backup VM.

3. The method of claim 2, further comprising:
when the priority level of the backup VM is at a highest priority level, detecting, at a set time interval, whether the master VM is abnormal; and
when the priority level of the backup VM is not at the highest priority level, releasing network resources occupied by the backup VM.

4. The method of claim 1, when the master VM is determined to be abnormal, further comprising:
receiving a second ARP mapping message for mapping the VIP address to the address of a backup VM from the backup VM, after the backup VM switches its IP address to the VIP address; and
sending the second ARP mapping message to the control center.

5. The method of claim 1, further comprising:
receiving a notification message sent by the control center for indicating the identifier of the master VM; and
sending the notification message to a VM in the VIP address system.

6. The method of claim 1, further comprising:
sending to the control center a request message sent by a VM for acquiring the identifier of the master VM;
receiving a response message from the control center carrying the identifier of the master VM; and
sending the response message to a VM.

7. The method of claim 1, further comprising:
receiving a heartbeat message sent by a VM; and
determining, based on the heartbeat message, whether the VIP address has switched and whether to send a second ARP mapping message to the control center.

8. A method for switching a virtual internet protocol (VIP) address, the method comprising:
receiving, from a virtual switch, a first ARP mapping message for mapping a VIP address to a virtual machine (VM) of a VIP address system using the VIP address, wherein the VIP address system comprises one or more VMs connected to one or more virtual switches, the one or more VMs and one or more virtual switches being located in one or more hosts, and the ARP mapping message is associated with a VM currently using the VIP address and includes the VIP address and the VM address of the VM currently using the VIP address;
determining the VM currently using the VIP address as a master VM based on the first ARP mapping message; and
sending a notification message including an identifier of the master VM to a VM in the VIP address system via the virtual switch connected to the VM.

9. The method of claim 8, further comprising:
determining, based on the configuration of a VM in the VIP address system, a priority level of the VM to become the master VM; and
storing an association relationship between an identifier of the VM and the priority level.

10. The method of claim 9, further comprising:
receiving, via a virtual switch, from a backup VM a request message for acquiring the association relationship; and
sending, via the virtual switch, the association relationship to the backup VM.

11. The method of claim 8, further comprising:
receiving, via a virtual switch, a request message for acquiring the identifier of the master VM from a VM; and
sending, via the virtual switch, to the VM a response message carrying the identifier of the master VM based on the request message.

12. A non-transitory computer readable medium that stores a set of instructions that is executable by at least one processor of a server to cause the server to perform a method for switching a virtual internet protocol (VIP) address, the method comprising:
providing for sending to a control center of a VIP address system a first address resolution protocol (ARP) mapping message for mapping a VIP address to a VM address of a virtual machine (VM) of the VIP address system, the VIP address system having one or more VMs connected to one or more virtual switches, the one or more VMs and one or more virtual switches being located in one or more hosts that are connected to the control center via a cloud network,
wherein the ARP mapping message is associated with a VM currently using the VIP address, includes the VIP address and the VM address of the VM currently using the VIP address, and is used by the control center to determine the VM currently using the VIP address as a master VM; and
providing for sending a notification message to a VM in the VIP address system, wherein the notification message is from the control center and includes an identifier of the master VM.

13. The medium of claim 12, wherein the set of instructions that is executable by the at least one processor of the server to cause the server to further perform:
providing for sending to the control center a request message sent by a backup VM for acquiring an association relationship between an identifier of the backup VM and its priority level to become the master VM;

acquiring the association relationship from the control center; and providing for sending the association relationship to the backup VM.

14. The medium of claim 13, wherein the set of instructions that is executable by the at least one processor of the server to cause the server to further perform:

when the priority level of the backup VM is at a highest priority level, detecting, at a set time interval, whether the master VM is abnormal; and when the priority level of the backup VM is not at the highest priority level, releasing network resources occupied by the backup VM.

15. The medium of claim 12, wherein, when the master VM is determined to be abnormal, the set of instructions that is executable by the at least one processor of the server to cause the server to further perform:

acquiring a second ARP mapping message for mapping the VIP address to the address of a backup VM from the backup VM, after the backup VM switches its IP address to the VIP address; and providing for sending the second ARP mapping message to the control center.

16. The medium of claim 12, wherein the set of instructions that is executable by the at least one processor of the server to cause the server to further perform:

acquiring a notification message sent by the control center for indicating the identifier of the master VM; and providing for sending the notification message to a VM in the VIP address system.

17. The medium of claim 12, wherein the set of instructions that is executable by the at least one processor of the server to cause the server to further perform:

providing for sending to the control center a request message sent by a VM for acquiring the identifier of the master VM;

acquiring a response message from the control center carrying the identifier of the master VM; and providing for sending the response message to a VM.

18. The medium of claim 12, wherein the set of instructions that is executable by the at least one processor of the server to cause the server to further perform:

acquiring a heartbeat message sent by a VM; and determining, based on the heartbeat message, whether the VIP address is switched and whether to send a second ARP mapping message to the control center.

19. A non-transitory computer readable medium that stores a set of instructions that is executable by at least one processor of a server to cause the server to perform a method for switching a virtual internet protocol (VIP) address, the method comprising:

acquiring, from a virtual switch, a first ARP mapping message for mapping a VIP address to a virtual machine (VM) of a VIP address system using the VIP address, wherein the VIP address system comprises one or more VMs connected to one or more virtual switches, the one or more VMs and one or more virtual switches being located in one or more hosts, and the ARP mapping message is associated with a VM currently using the VIP address and includes the VIP address and the VM address of the VM currently using the VIP address;

determining the VM currently using the VIP address as a master VM based on the first ARP mapping message; and providing for sending a notification message including an identifier of the master VM to a VM in the VIP address system via the virtual switch connected to the VM.

20. The medium of claim 19, wherein the set of instructions that is executable by the at least one processor of the server to cause the server to further perform:

determining, based on the configuration of a VM in the VIP address system, a priority level of the VM to become the master VM; and storing an association relationship between an identifier of the VM and the priority level.

21. The medium of claim 20, wherein the set of instructions that is executable by the at least one processor of the server to cause the server to further perform:

acquiring, via a virtual switch, from a backup VM a request message for acquiring the association relationship; and providing for sending, via the virtual switch, the association relationship to the backup VM.

22. The medium of claim 19, wherein the set of instructions that is executable by the at least one processor of the server to cause the server to further perform:

acquiring, via a virtual switch, a request message for acquiring the identifier of the master VM from a VM; and providing for sending, via the virtual switch, to the VM a response message carrying the identifier of the master VM based on the request message.

23. A virtual internet protocol (VIP) address switching apparatus, the apparatus comprising:

a memory storing a set of instructions; and a hardware processor configured to execute the set of instructions to cause the apparatus to:

send a control center of a VIP address system a first address resolution protocol (ARP) mapping message for mapping a VIP address to a VM address of a virtual machine (VM) of the VIP address system, the VIP address system having one or more VMs connected to one or more virtual switches, the one or more VMs and one or more virtual switches being located in one or more hosts that are connected to the control center via a cloud network, wherein the ARP mapping message is associated with a VM currently using the VIP address, includes the VIP address and the VM address of the VM currently using the VIP address, and is used by the control center to determine the VM currently using the VIP address as a master VM; and send a notification message to a VM in the VIP address system, wherein the notification message is from the control center and includes an identifier of the master VM.

24. The apparatus of claim 23, wherein the hardware processor is further configured to execute the set of instructions to cause the apparatus to:

send to the control center a request message sent by a backup VM for acquiring an association relationship between an identifier of the backup VM and its priority level to become the master VM;

receive the association relationship from the control center; and send the association relationship to the backup VM.

25. The apparatus of claim 24, wherein the hardware processor is further configured to execute the set of instructions to cause the apparatus to:

when the priority level of the backup VM is at a highest priority level, detect, at a set time interval, whether the master VM is abnormal; and when the priority level of the backup VM is not at the highest priority level, release network resources occupied by the backup VM.

26. The apparatus of claim 23, wherein the hardware processor is further configured to execute the set of instructions to cause the apparatus to:

receive a second ARP mapping message for mapping the VIP address to the address of a backup VM from the backup VM, after the backup VM switches its IP address to the VIP address; and send the second ARP mapping message to the control center.

27. The apparatus of claim 23, wherein the hardware processor is further configured to execute the set of instructions to cause the apparatus to:

receive a notification message sent by the control center for indicating the identifier of the master VM; and send the notification message to a VM in the VIP address system.

28. The apparatus of claim 23, wherein the hardware processor is further configured to execute the set of instructions to cause the apparatus to:

send to the control center a request message sent by a VM for acquiring the identifier of the master VM;

receive a response message from the control center carrying the identifier of the master VM; and send the response message to a VM.

29. The apparatus of claim 23, wherein the hardware processor is further configured to execute the set of instructions to cause the apparatus to:

receive a heartbeat message sent by a VM; and determine, based on the heartbeat message, whether the VIP address is switched and whether to send a second ARP mapping message to the control center.

30. A virtual internet protocol (VIP) address switching apparatus, the apparatus comprising:

a memory storing a set of instructions; and a hardware processor configured to execute the set of instructions to cause the apparatus to:

receive, from a virtual switch, an ARP mapping message for mapping a VIP address to a VM currently using the VIP address, wherein the ARP mapping message is associated with the VM currently using the VIP address and includes the VIP address and the VM address of the VM currently using the VIP address;

determine the VM currently using the VIP address as a master VM based on the ARP mapping message; and send a notification message including an identifier of the master VM to a VM in the VIP address system via the virtual switch connected to the VM.

31. The apparatus of claim 30, wherein the hardware processor is further configured to execute the set of instructions to cause the apparatus to:

determine, based on the configuration of a VM in the VIP address system, a priority level of the VM to become the master VM; and store an association relationship between an identifier of the VM and the priority level.

32. The apparatus of claim 31, wherein the hardware processor is further configured to execute the set of instructions to cause the apparatus to:

receive, via a virtual switch, from a backup VM a request message for acquiring the association relationship; and send, via the virtual switch, the association relationship to the backup VM.

33. The apparatus of claim 30, wherein the hardware processor is further configured to execute the set of instructions to cause the apparatus to:

receive, via a virtual switch, a request message for acquiring the identifier of the master VM from a VM; and send, via the virtual switch, to the VM a response message carrying the identifier of the master VM based on the request message.

34. A virtual internet protocol (VIP) address system, the system comprising:

a control center comprising a memory storing a set of instructions and a hardware processor configured to execute the set of instructions, and at least one host connected to the control center via a cloud network, the at least one host being provided with a virtual machine (VM) and a virtual switch connected to the VM, wherein the virtual switch is configured to send to the control center an address resolution protocol (ARP) mapping message for mapping a VIP address to a VM address of a VM; and wherein the hardware processor of the control center is configured to execute the set of instructions to cause the control center to:

receive the ARP mapping message from the virtual switch, wherein the ARP mapping message is associated with a VM currently using the VIP address and includes the VIP address and the VM address of the VM currently using the VIP address, determine, based on the ARP mapping message, the VM currently using the VIP address as a master VM, and send, via the virtual switch, the notification message including an identifier of the master VM to a VM in the VIP address system.

* * * * *